(12) United States Patent
Ward et al.

(10) Patent No.: US 8,587,814 B2
(45) Date of Patent: Nov. 19, 2013

(54) ADAPTIVE RASTERIZED DATA MANAGEMENT FOR MULTI-MEMORY SYSTEMS

(75) Inventors: David Ward, Broomfield, CO (US); John T. Varga, Longmont, CO (US); Robert Keeble, Edgewater, CO (US)

(73) Assignee: Ricoh Company, Ltd., Tokyo (JP)

( * ) Notice: Subject to any disclaimer, the term of this patent is extended or adjusted under 35 U.S.C. 154(b) by 225 days.

(21) Appl. No.: 13/221,529

(22) Filed: Aug. 30, 2011

(65) Prior Publication Data

US 2013/0050742 A1    Feb. 28, 2013

(51) Int. Cl.
*G06F 15/00* (2006.01)
*G06F 3/12* (2006.01)
*G06K 1/00* (2006.01)

(52) U.S. Cl.
USPC .......................................... 358/1.15; 358/1.1

(58) Field of Classification Search
None
See application file for complete search history.

(56) References Cited

U.S. PATENT DOCUMENTS

| | | | |
|---|---|---|---|
| 2004/0196496 A1 | 10/2004 | Klassen | |
| 2007/0139710 A1* | 6/2007 | Ohta | 358/1.16 |
| 2008/0037048 A1* | 2/2008 | Hopper et al. | 358/1.13 |
| 2010/0277757 A1 | 11/2010 | Smith | |
| 2010/0302576 A1 | 12/2010 | Varga et al. | |
| 2011/0007341 A1 | 1/2011 | Carney et al. | |

* cited by examiner

*Primary Examiner* — Douglas Tran
(74) *Attorney, Agent, or Firm* — Duft, Bornsen & Fettig LLP

(57) ABSTRACT

Systems and methods are provided for implementing adaptive rasterized print data management. The printing system is able to acquire a print job and instructions for printing multiple copies of the job. The control unit is also able to initiate processing of a first copy of the print job, to instruct a Raster Image Processor (RIP) to rasterize a data segment of the print job, and to determine a transfer time to transfer the rasterized data segment to a marking engine if it were stored at the first memory. Further, the control unit is able to determine a threshold value, and to facilitate storage of the rasterized data segment at the second memory if the transfer time is greater than the threshold value.

20 Claims, 5 Drawing Sheets

ADAPTIVE RASTERIZED DATA MANAGEMENT FOR MULTI-MEMORY SYSTEMS

FIELD OF THE INVENTION

The invention relates to the field of printing systems, and in particular, to print spool management at a printing system.

BACKGROUND

Printing systems comprise a variety of embodiments, and typically include one or more printers for receiving and printing incoming jobs by use of a marking engine. In addition to the printers themselves, the printing system may include print servers, clients, hosts, and other specialized printing applications implemented on computer systems. These additional components may facilitate the generation and transfer of print jobs within the printing system. For example, in one printing system, multiple client applications may each submit print jobs to a print server. The print server may then sort, pre-process, and transmit these received jobs to one or more of the printers for printing.

In printing systems, the overall printing speed is typically bottlenecked by the speed of rasterization that takes place at a print controller. The rasterized version of the print job, generated by the RIP, may require significant processing resources to generate, and may be orders of magnitude larger in size than the original print job. This rasterized job may then be sent to a marking engine for printing. In continuous-form printing systems, it may be particularly important for rasterized data to be generated and provided to a marking engine at a high rate of speed, because if the rasterized data is not provided quickly enough, it may be necessary to halt the continuous-form printing process. Because the media traveling through the printing system moves at a high rate of speed, any sudden halts in printing place physical strain on the printing medium, thereby increasing the potential for ripping the printed media.

When multiple copies of a print job are requested, printing systems often attempt to increase printing speed by utilizing a print spool. In such systems, the RIP rasterizes the entire first copy of the print job and stores it at the spool. Thus, when printing initiates for the additional copies of the print job, the marking engine may simply use the already-rasterized data from the print spool. This saves processing time at the RIP, which is thought to be beneficial because the RIP itself may bottleneck the overall speed of the printing system. However, users of printing systems continue to desire systems and methods that increase the speed at which rasterized print data is provided to marking engines.

SUMMARY

Embodiments described herein utilize the multiple memory components of printing systems in order to ensure that rasterized data at a print spool is provided to a printing device more rapidly (e.g., fast enough to reduce potential for stopping of a continuous form marking engine). Prior printing systems typically rasterize segments of print data using an active, high-speed memory such as Random Access Memory (RAM), but typically store the rasterized print spool data at a slower, high-capacity memory (e.g., a hard disk, optical media, flash memory, tape drive, etc.).

Embodiments described herein take advantage of the increased transfer speed of high-speed memory (e.g., memory used for rasterization). For example, for a given rasterized data segment, embodiments may determine if the rasterized (and potentially compressed) data segment can be transferred from a slower memory to a marking engine without slowing down the marking engine. If the transfer time from the slower memory is too slow, it may be beneficial to store the rasterized data segment at the high-speed memory. In this manner, when the printing system initiates printing of additional copies of the print job, it may selectively retrieve certain segments of the print job from high-speed memory and retrieve others from a slower-memory print spool. This may in turn increase the speed that rasterized data is provided to the marking engine, thereby reducing the chances of halting operations at the marking engine.

One embodiment is a printing system implementing adaptive rasterized print data management. The printing system includes a first memory, a second memory, and a Raster Image Processor (RIP) coupled with the first and second memories and able to rasterize print data. The printing system also includes a control unit. The control unit is coupled with the RIP, and is able to acquire a print job and instructions for printing multiple copies of the print job. The control unit is also able to initiate processing of a first copy of the print job, to instruct the RIP to rasterize a data segment of the print job, and to determine a transfer time to transfer the rasterized data segment to a marking engine if it were stored at the first memory. Further, the control unit is able to determine a threshold value, and to facilitate storage of the rasterized data segment at the second memory if the transfer time is greater than the threshold value.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
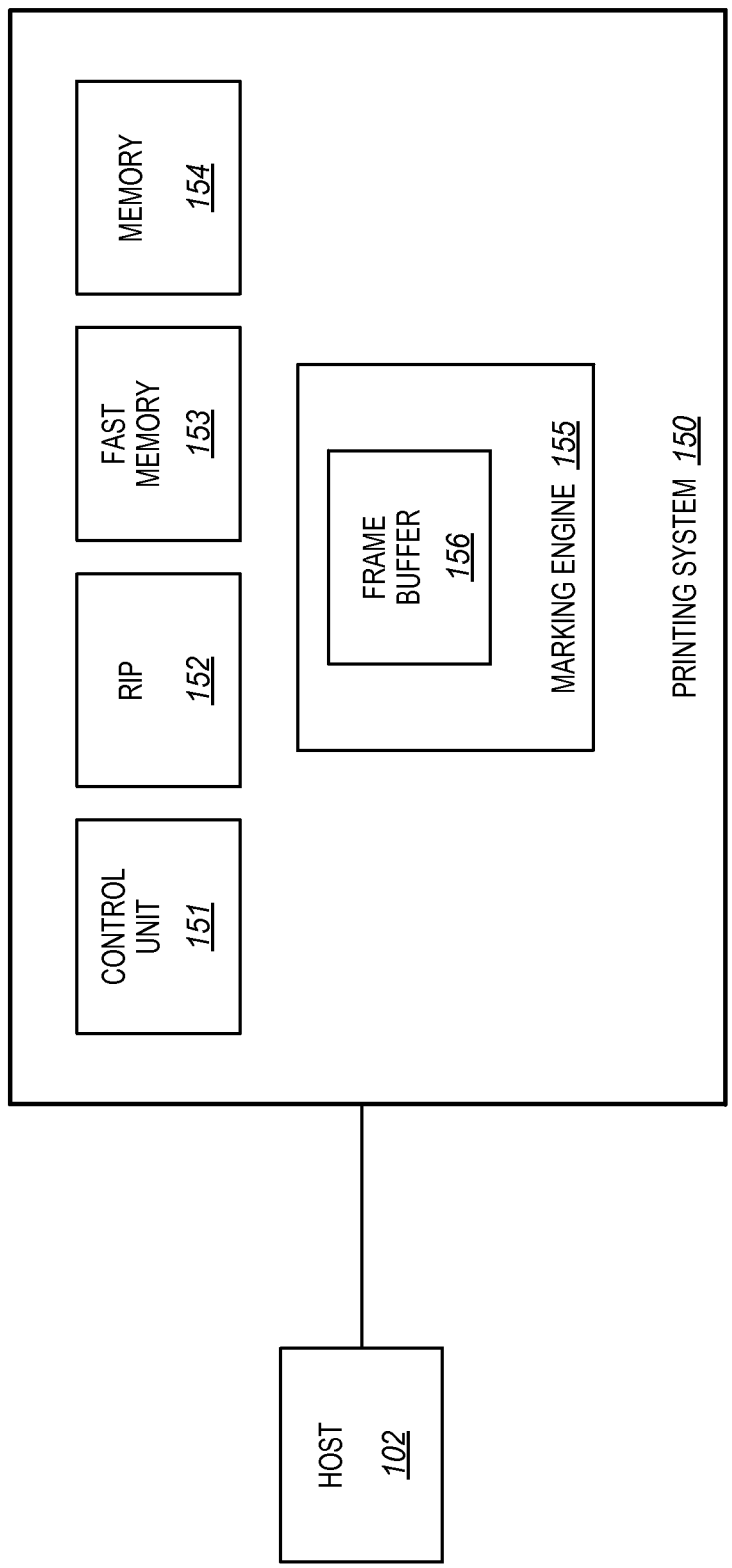
FIG. 1 is a block diagram of a printing system in an exemplary embodiment.

FIG. 1 is a block diagram of a printing system 150 in an exemplary embodiment. Printing system 150 comprises any system, device, or component operable to process incoming print jobs and present them on a presentation device. For example, printing system 150 may comprise a high-speed, continuous form printing system for generating a hard-copy of a print job on a continuous form marking engine. In this embodiment, printing system 150 receives incoming print jobs from host 102. Host 102 may comprise, for example, hardware systems or software systems implemented on generic computers. Host 102 may generate the print jobs, or host 102 may perform print server functions by routing, pre-processing, and/or sorting incoming print jobs for printing at printing system 150. Preferably, the print jobs received by printing system 150 from host 102 comprise print data formatted according a defined Page Description Language (PDL). In some embodiments, the print jobs may be formatted according to the Advanced Function Presentation (AFP) architecture of Ricoh Production Print Solutions, LLC. In order to process incoming print jobs, printing system 150 includes control unit 151, Raster Image Processor (RIP) 152, fast memory 153, memory 154, and marking engine 155.

Control unit 151 comprises any system, device, or component operable to manage the operations of printing system 150. In one embodiment, control unit 151 includes processing logic for printing system 150 implemented as programmed instructions on a hardware processor (e.g., one or more general or special purpose processors and associated program memory).

RIP 152 comprises any system, device, or component operable to receive incoming print data and generate a rasterized version of that print data. One of ordinary skill in the art will appreciate that rasterized data is data that may be used, for example, directly by marking engine 155 without a need for translation or other processing. RIP 152 may be implemented at a single general or special purpose processor, or may comprise multiple processors capable of operating in parallel with each other. Control unit 151 may selectively store (e.g., save) rasterized data from RIP 152 at fast memory 153 or at memory 154 for later transmission to marking engine 155. For example, in printing multiple copies of a document, the first copy may be directed to the marking engine essentially as the print job is initially rasterized. However, in printing subsequent copies, the previously rasterized data may be retrieved from fast memory 153 or memory 154 for transmission to the marking engine 155. Data stored in fast memory 153 may be retrieved more quickly than data stored in memory 154. Thus, printing system 150 is adapted to selectively determine in which memory to store previously rasterized print data so as to help assure sufficient data transfer to marking engine 155 to avoid the need to stop the marking engine.

Marking engine 155 comprises any system, component, or device operable to utilize rasterized print data for presentation on a physical medium (e.g., paper) based upon the rasterized print data. For example, marking engine 155 may be implemented as a series of ink jet print heads, may comprise a laser printing embodiment, or may comprise more exotic systems for marking and finishing imprinted physical media (e.g., stitching, stamping, etc.). Marking engine 155 may further comprise a frame buffer 156 for receiving rasterized data to be used during the presentation process by marking engine 155. Fast memory 153 and frame buffer 156 may be partitions of the same physical storage device (e.g., a Video Random Access Memory (VRAM) or Dynamic RAM (DRAM)), or may be implemented on physically separate storage devices. Control unit 151 may provide rasterized print data from either of fast memory 153 or memory 154 to frame buffer 156.

Fast memory 153 comprises any memory capable of storing rasterized versions of segments of print data. In one embodiment, fast memory 153 comprises a Random Access Memory (RAM) or other volatile memory component. Control unit 151 is capable of providing rasterized data from fast memory 153 via a communication channel, and fast memory 153 is associated with a transfer speed for moving data to marking engine 155. The transfer speed may be limited by the rate at which fast memory 153 retrieves stored data, may be limited by properties of the communication channel used by control unit 151, or may be limited by other factors. For example, transfer speed may vary depending on the fragmentation level of fast memory 153.

Memory 154 also comprises any memory capable of storing rasterized versions of segments of print data, and control unit 151 is also capable of providing rasterized data from memory 154 to marking engine 155 via a communication channel. However, memory 154 is associated with a slower transfer speed than fast memory 153. This slower transfer rate may be due, for example, to the rate at which memory 154 itself retrieves data (which may vary, for example, depending on the fragmentation level of memory 154), the communication channel used by memory 154, and/or other factors. In one embodiment, memory 154 is implemented as a high-volume storage device (e.g., a hard disk, flash memory, optical media, tape drive, etc.), although other implementations (e.g., RAM) may potentially be used.

High-volume storage devices typically provide the benefit of vast amounts of available memory at a relatively low cost. However, such storage devices often have low data transfer rates (relative to faster memories such as RAM devices), meaning that accessing the data stored on these devices requires a certain, not insignificant, amount of time to retrieve and provide to a marking engine. When moving large portions of rasterized data, this results in a significant performance hit. If the transfer rate is too low, then the marking engine may potentially slow down or even halt because it won't receive print data fast enough to keep up with its physical printing speed. Printing systems typically move data to a marking engine faster when utilizing fast memories (e.g., RAM) than when utilizing high-volume storage devices. However, because faster memories will typically be more expensive than high-volume memories, it is not generally practical to provide printing system 150 with sufficient capacity to store an entire rasterized print job at a faster memory. Thus, fast memory 153 may have a significantly smaller capacity to store rasterized data segments as compared to memory 154. Printing system 150 is capable of balancing these two issues, and selectively storing segments of rasterized print data at fast memory 153 in order to improve the speed that rasterized data is provided to marking engine 155.

Using the system of FIG. 1, printing system 150 may implement enhanced rasterized data management techniques in order to maintain desired print speeds on high performance printing systems. Further details of such operations of printing system 150 will be discussed with regard to FIG. 2. Assume, for this embodiment, that printing system 150 is initialized to receive and process incoming print jobs.

Figure 2:
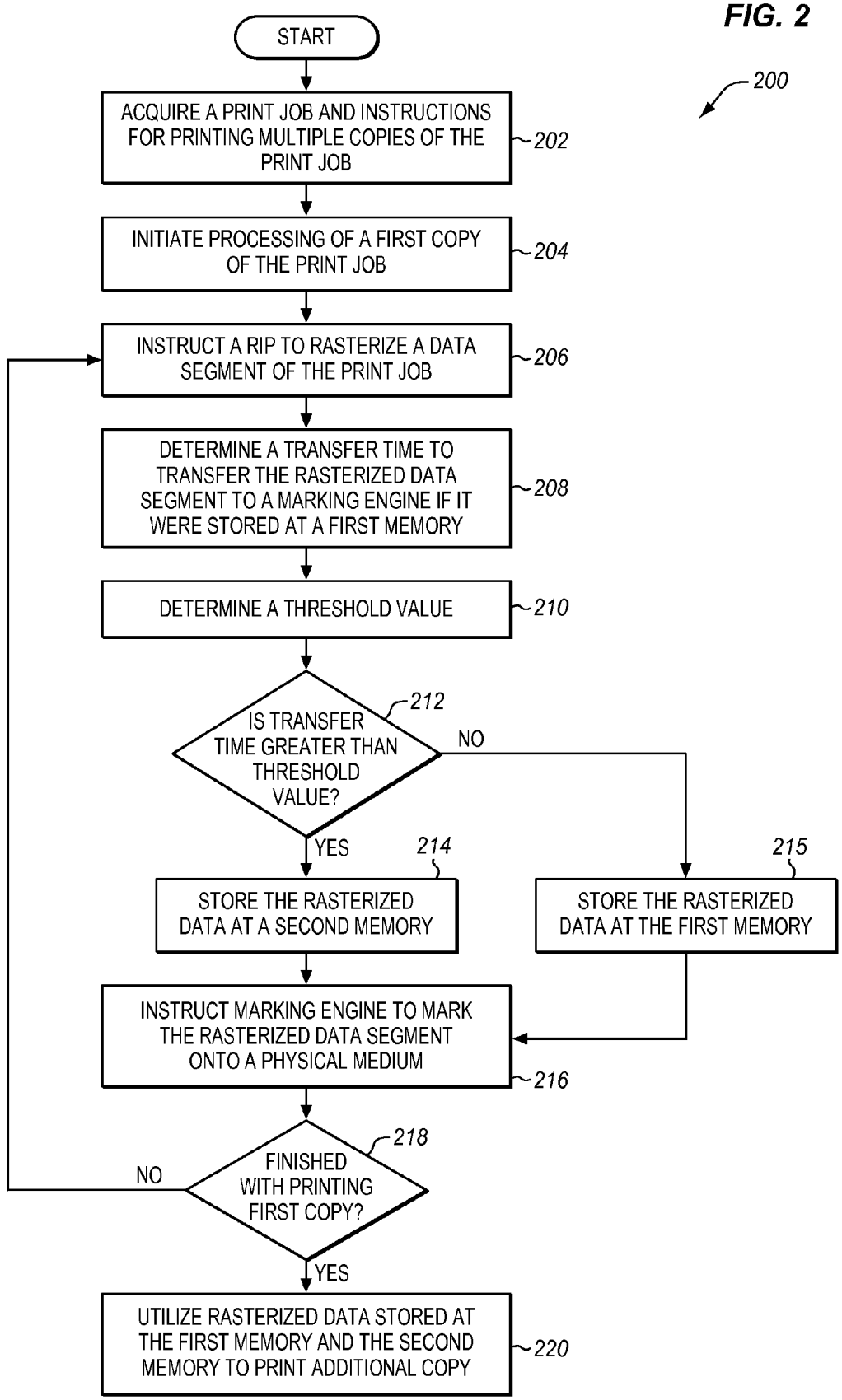
FIG. 2 is a flowchart illustrating a method for rasterized data management in an exemplary embodiment.

FIG. 2 is a flowchart illustrating a method 200 for rasterized data management in an exemplary embodiment. The steps of method 200 are described with reference to printing system 150 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, control unit 151 acquires a print job and instructions for printing multiple copies of the print job. The print job may be received directly by control unit 151 from host 102, or control unit 151 may access the print job as it is stored in a memory. The print data for the job will preferably be defined according to a Page Description Language (PDL) such as Advanced Function Presentation (AFP), Portable Document Format (PDF), or others. In one embodiment, the print job is accompanied by a job ticket (e.g., a Job Definition Format (JDF) job ticket) that explicitly indicates a number of copies to be printed for the print job.

In step 204, control unit 151 initiates processing of a first copy of the print job. This process may include, for example, segmenting the print data into data segments. These data segments may be separated based on logical page, sheet image, a specifically sized portion, tags in the print data or job ticket, or other criteria.

In step 206, control unit 151 instructs RIP 152 to rasterize a data segment of the print job. RIP 152 may access the data segment, for example, via control unit 151. RIP 152 may then rasterize the data segment, and may build the rasterized data segment utilizing, for example, frame buffer 156 (which may comprise a buffer portion of fast memory 153). As RIP 152 rasterizes each data segment, control unit 151 or other elements of printing system 150 may compress the rasterized segments in order to save space in memory and reduce transfer times. For example, the compressed size may be negligible (e.g., a few kilobytes), while the uncompressed version may be much larger (e.g., tens of megabytes). The amount of space savings for any given segment of compressed rasterized data will naturally depend on the data that is rasterized, and will vary from data segment to data segment. In the following steps, printing system 150 may perform the method described upon either of compressed or uncompressed versions of the rasterized data generated by RIP 152.

In step 208, control unit 151 determines a transfer time to transfer the rasterized data segment to marking engine 155 if it were stored in memory 154. This transfer time may be based on, for example, the speed at which memory 154 can retrieve data, the speed of a communication channel used by control unit 151 to transfer data from memory 154, latency at the printing system, size of the rasterized data segment, and other factors. The transfer time indicates, for example, the amount of time it would take for the rasterized data segment to be retrieved from memory 154 and forwarded to marking engine 155 (e.g., via a communication channel to frame buffer 156). If memory 154 is being used by multiple devices concurrently, the transfer speed of memory 154 in transferring rasterized data to marking engine 155 may be reduced, because the data transfer rate of memory 154 may be shared across multiple tasks.

In step 210, control unit 151 determines a threshold value. The threshold value represents the boundary between situations where it would be favorable to store the rasterized data at memory 154, and situations where it would be favorable to store the rasterized data at fast memory 153. This threshold value may be statically defined, or may vary based upon various criteria (e.g., printing speed, amount of space left at fast memory 153, the data segment being processed, etc.). For example, the threshold value may indicate a maximum allowable transfer time to ensure that marking engine 155 does not slow down or halt. In such situations, the threshold value may be defined based on the printing speed of marking engine 155, and may vary as the speed of marking engine 155 varies. The threshold value may be implemented as a specific amount of time, a percentage, a ratio, or other unit of measure as desired.

In some embodiments, the threshold value may vary depending on a prior threshold value for prior data segments. For example, assume that a marking engine takes one second to print a data segment. Thus, the default value of the threshold value may be defined as one second. If prior transfer times for prior data segments were below one second, then the amount of time that the stored data is "ahead" of marking engine 155 increases. Thus, for example, the value for the threshold for the next data segment could be increased by that amount. Similarly, when a data segment takes more than one second to transfer, it may reduce the threshold for the next data segment by the amount that it is over one second.

In step 212, control unit 151 determines if the transfer time is greater than the threshold value. Because space at fast memory 153 may be limited as compared to memory 154, it may be desirable to only store rasterized print data at fast memory 153 if there is a potential slowdown at marking engine 155. So long as the transfer times from memory 154 are below the threshold, there is no threat that marking engine 155 will run out of incoming rasterized print data. Thus, there is no benefit to utilizing fast memory 153. However, if the transfer time is greater than the threshold, there may be a danger that marking engine 155 will run out of rasterized data and have to slow down or halt entirely. In these circumstances, it may be beneficial to use fast memory 153 because it has a faster data transfer rate and therefore a shorter transfer time. Thus, fast memory 153 may supply marking engine 155 with data more quickly than memory 154.

Note that in many embodiments, fast memory 153 may be incapable of storing an entire rasterized version of the print job. Thus, fast memory 153 may reach a maximum capacity as further data segments of the print job are processed. If fast memory 153 reaches this maximum capacity, it may be desirable to simply store the remaining rasterized data segments to memory 154 without checking to see if they are above or below the threshold.

In another embodiment, when fast memory 153 reaches maximum capacity it may be desirable to replace some rasterized data segments in fast memory 153 with others. By way of example, there may be a data segment in fast memory 153 for which the transfer time is marginally slower than the threshold transfer time. In order to accumulate enough time to keep marking engine 155 moving at the desired speed, it may be useful to replace this data segment in fast memory 153 with another much slower data segment in order to ensure that a faster transfer time is achieved within the capacity limitations of the printing system.

Maximum capacity for fast memory 153 may be defined by the actual physical data capacity of fast memory 153, or may represent some fraction thereof. For example, if marking engine 155 uses a partitioned portion of fast memory 153 to implement frame buffer 156, the maximum capacity may be the physical data capacity of the storage device implementing fast memory 153, minus the maximum (actual or estimated) amount of space to be used in frame buffer 156 that will be used by a rasterized data segment. By selectively storing certain rasterized data segments at fast memory 153 and others at memory 154, control unit 151 beneficially increases the speed at which rasterized data is provided to marking engine 155, without overcrowding fast memory 153 beyond its capacity.

In step 214, printing system 150 stores the rasterized data segment at fast memory 153, responsive to control unit 151 determining that the transfer time is greater than the threshold value. Alternatively, in step 215 printing system 150 stores the rasterized data segment at memory 154, responsive to determining that the transfer time is not greater than the threshold value.

In step 216, control unit 151 may instruct marking engine 155 to mark the rasterized data segment onto a physical medium. During processing of the first copy of the print job, the rasterized print data may be provided, for example, from frame buffer 156 as RIP 152 rasterizes the data. However, while processing additional copies of the print job, control unit 151 may provide the rasterized data from either of fast memory 153 or memory 154, depending on whether step 214 or 215 was performed for the data segment. Using this rasterized data, marking engine 155 may mark a physical medium to generate a printed document.

In step 218, control unit 151 may determine whether it has finished processing all data segments of the first copy of the print job. If not, control unit 151 acquires the next data segment, and continues method 200 from step 206. However, if the data segments of the first copy have completed processing, control unit 151 may initiate printing of additional copies.

In step 220, control unit 151 initiates processing of additional copies, and utilizes stored rasterized data stored at fast memory 153 and memory 154 to print the additional copies. Control unit 151 may proceed, on a segment-by-segment basis, to see whether a rasterized version of the data segment exists at fast memory 153 or memory 154. Control unit 151 may then provide rasterized data to marking engine 155 from the appropriate memory. Note that marking engine 155 need not have completed printing of the first copy in order for control unit 151 to initiate processing of additional copies of the print job.

Thus, printing system 150 may utilize each of its memories in a more time-efficient manner than traditional printing systems. This in turn may increase the rate at which rasterized data is provided to a marking engine at printing system 150, preventing a slowdown in the rate of printing at the system. Note that for printing systems having more than two memories, the method 200 may be applied at multiple levels on the printing system at the same time.

EXAMPLE

In the following example, additional processes, systems, and methods are described in the context of an exemplary printing system that processes and prints multiple copies of an incoming three-page print job. In particular, FIG. 3 illustrates the printing system as it processes the first copy, while FIG. 4 illustrates the printing system as it processes additional copies of the print job.

Figure 3:
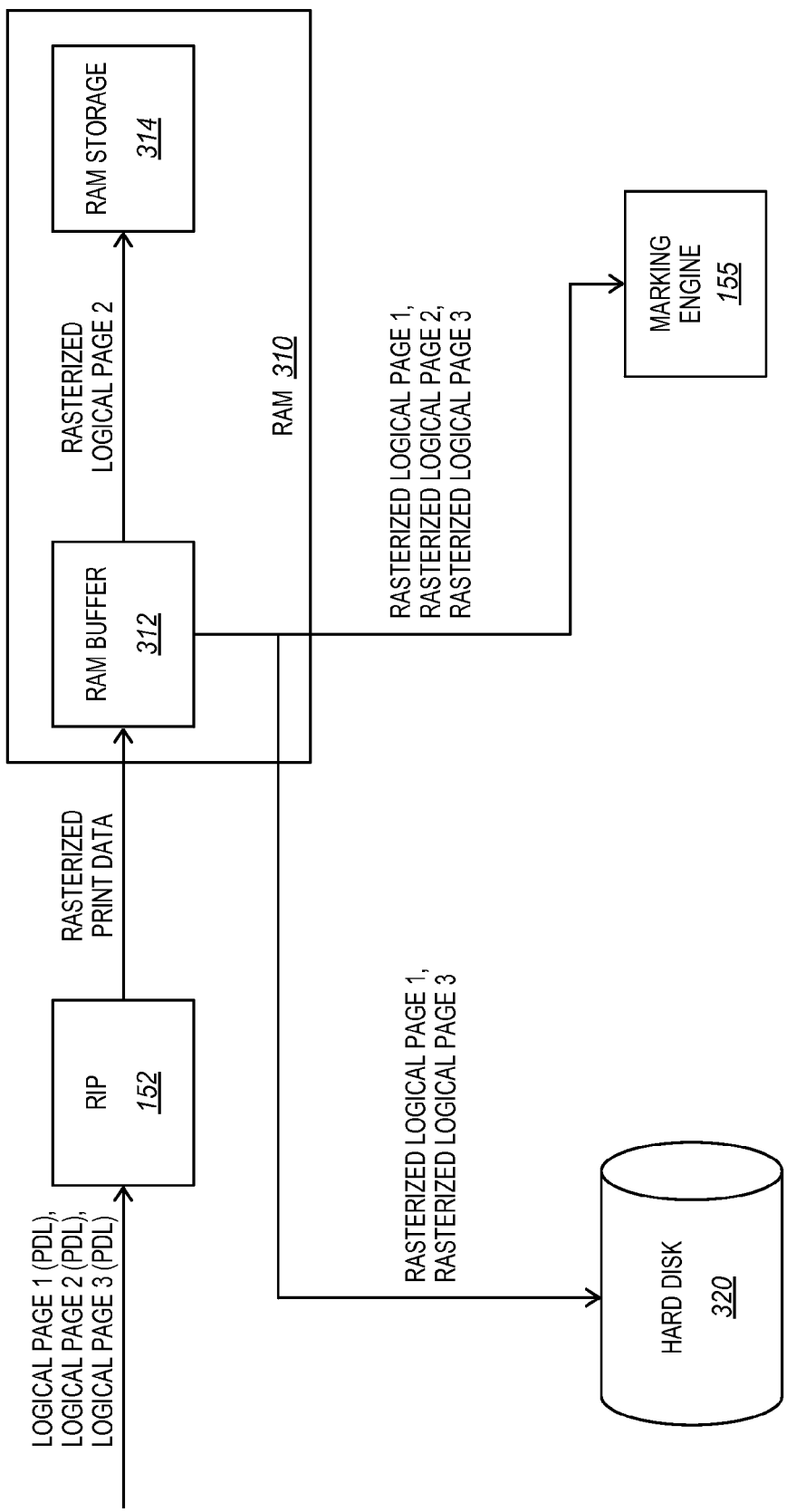
FIG. 3 is a block diagram illustrating a process flow for a printing system as it prints a first copy of a print job in an exemplary embodiment.
Figure 4:
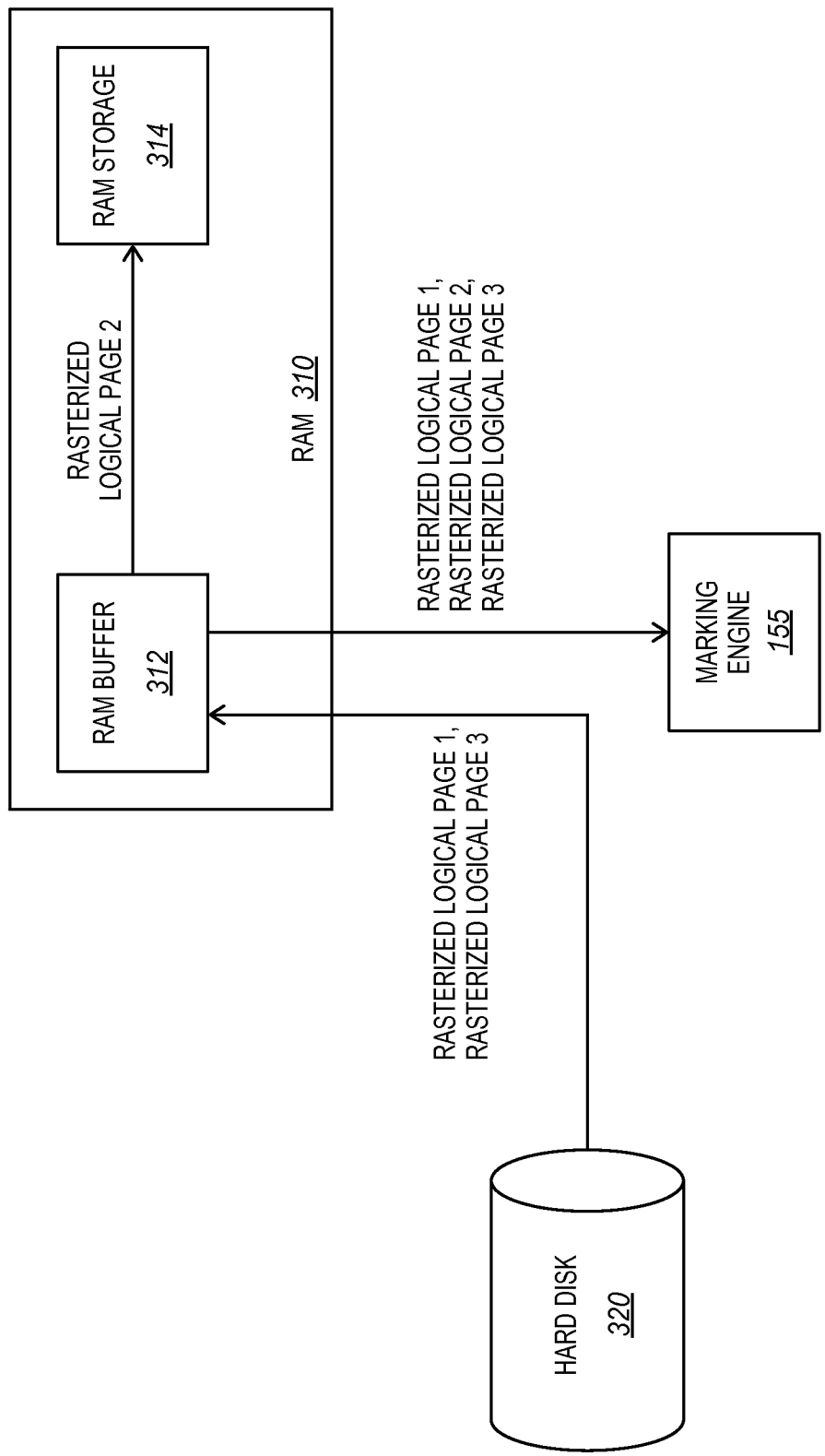
FIG. 4 is a block diagram illustrating a process flow for a printing system as it prints an additional copy of a print job in an exemplary embodiment.

FIG. 3 is a block diagram illustrating a process flow for a printing system as it prints a first copy of a print job in an exemplary embodiment. According to FIG. 3, control unit 151 first retrieves a print job formatted according to a Page Description Language (PDL). This print job may be received directly from host 151, or may be retrieved from a memory such as memory 154 of FIG. 1. In the PDL format (i.e., the compressed state), the print job occupies a minimal amount of space in memory, and may be stored and retrieved almost instantaneously by control unit 151.

Control unit 151 processes the PDL print job and segments it into three logical pages. Each of the logical pages is transmitted to RIP 152 for rasterization. RIP 152 initiates processing of the logical pages in sequence, utilizes RAM buffer 312 of RAM memory 310 to generate completed rasterized pages, and utilizes RAM storage 314 or hard disk 320 to store rasterized print data. In this embodiment, RAM storage 314 is implemented as Dynamic RAM (DRAM) coupled with RAM buffer 312, while RAM buffer 312 is implemented as a Video RAM (VRAM) coupled with marking engine 155. As the first copy is processed, rasterized pages may be sent to marking engine 155 directly from RAM buffer 312 as they are completed by RIP 152. However, RAM buffer 312 is overwritten as each new logical page is processed by RIP 152. As control unit 151 sends over each logical page to marking engine 155 from RAM buffer 312, control unit 151 decides whether to spool the logical page at RAM storage 314 (e.g., an implementation of fast memory 153) or hard disk 320 (e.g., an implementation of memory 154).

Control unit 151 makes this determination based upon the transfer time for hard disk 320 and a threshold value. To determine the transfer time, control unit 151 calculates the data retrieval speed of each of hard disk 320 based upon the current fragmentation level of hard disk 320, other Input/Output (I/O) operations being performed at hard disk 320, and other factors. In this embodiment, control unit 151 also limits the data retrieval speed based upon the currently available transmission speed across the communication channel linking hard disk 320 to RAM buffer 312 (and therefore marking engine 155). Control unit 151 further divides the size of the rasterized logical page by the transfer speed of hard disk 320 to get the transfer time.

With knowledge of the current speed of marking engine 155, control unit 151 determines a threshold value to use when comparing the transfer times between RAM storage 314 and hard disk 320. In this example, the threshold value is one tenth of a second, and represents the amount of time it takes marking engine 155 to print a logical page.

As each logical page is processed, control unit 151 compares the transfer time to the threshold value. For pages one and three, the transfer time is not above the threshold. Because of this, there is no significant performance benefit to storing these rasterized pages at RAM storage 314. Therefore, control unit 151 stores rasterized logical pages one and three (e.g., segments of the print job) at hard disk 320. However, for logical page two, the transfer time to hard disk 320 is larger than the threshold value. Therefore, it is beneficial to spool logical page two to RAM storage 314 instead of hard disk 320 in order to prevent marking engine 155 from slowing down. Once all three of the logical pages have been processed, control unit 151 initiates processing of the second copy of the print job.

FIG. 4 is a block diagram illustrating a process flow for a printing system as it prints an additional copy of a print job in an exemplary embodiment. According to FIG. 4, control unit 151 analyzes a memory structure (e.g., table, list, database, etc.) describing the logical pages of the print job as it processes the additional copy. At the memory structure, each logical page is associated with an indicator describing whether a rasterized version has been stored at hard disk 320 or RAM storage 314. Control unit 151 sends each rasterized page from its stored location (in RAM 314 or hard disk 320) to marking engine 155 via RAM buffer 312. Thus, rasterized logical pages one and three are provided by hard disk 320, and rasterized logical page two is provided by RAM storage 314.

Figure 5:
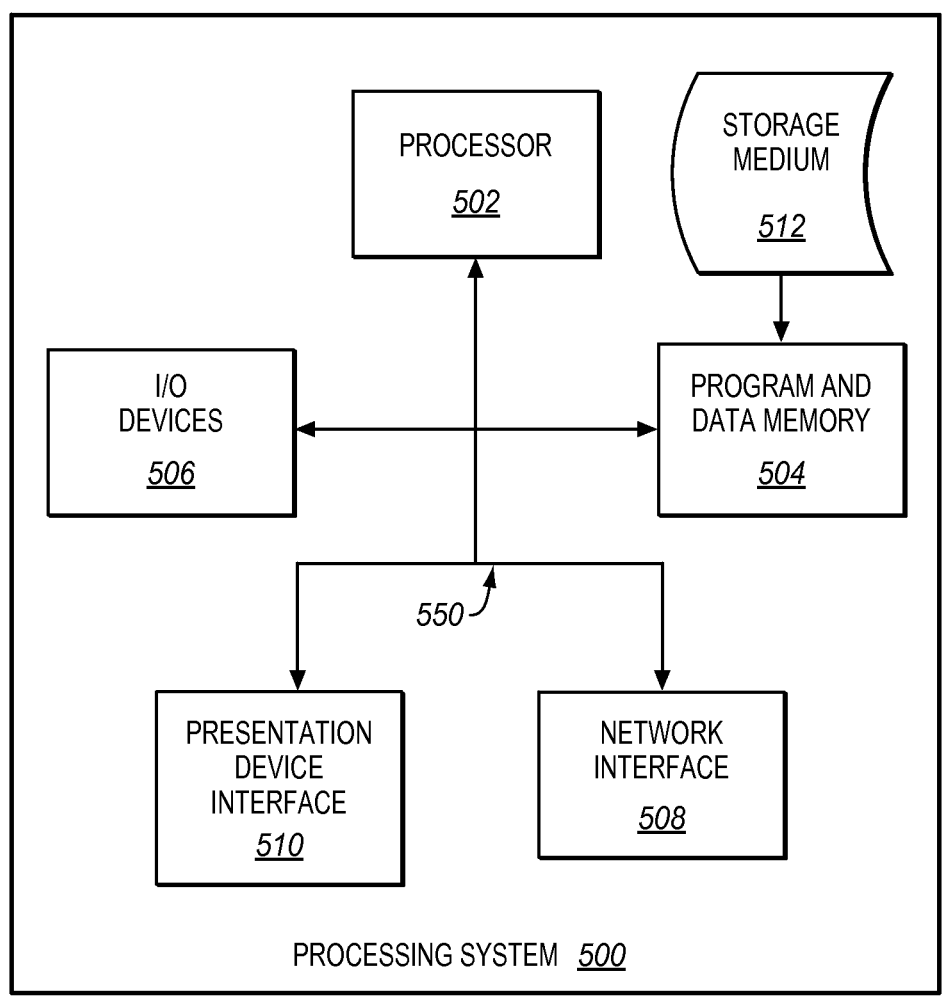
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 150 to perform the various operations disclosed herein. FIG. 5 illustrates a processing system 500 operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be integrated with the system to interface to one or more presentation devices, such as printing systems and displays for presentation of presentation data generated by processor 502.

Although specific embodiments were described herein, the scope of the invention is not limited to those specific embodiments. The scope of the invention is defined by the following claims and any equivalents thereof.

We claim:

1. A printing system, comprising:
a first memory;
a second memory;
a Raster Image Processor (RIP) coupled with the first and second memories and operable to rasterize print data;
a control unit coupled with the RIP, the control unit operable to acquire a print job and instructions for printing multiple copies of the print job, to initiate processing of a first copy of the print job, to instruct the RIP to rasterize a data segment of the print job, to determine a transfer time to transfer the rasterized data segment to a marking engine if it were stored at the first memory, to determine a threshold value, and to facilitate storage of the rasterized data segment at the second memory if the transfer time is greater than the threshold value.

2. The printing system of claim 1, wherein:
the control unit is further operable to determine the threshold value as based on a speed of the marking engine and a threshold value for a data segment that has been previously rasterized.

3. The printing system of claim 2, wherein:
the control unit is further operable to determine the threshold value based on an amount of free space at the second memory.

4. The printing system of claim 1, wherein:
the control unit is operable to instruct the RIP to rasterize, to determine the transfer time, to determine the threshold value, and to facilitate storage of the rasterized data segment for each data segment of the print job.

5. The printing system of claim 1, wherein:
the control unit is further operable to facilitate storage of the rasterized data segment at the first memory if the transfer time is smaller than the threshold value.

6. The printing system of claim 1, wherein:
the control unit is further operable to initiate processing of an additional copy of the print job, and to bypass rasterization for the additional copy of the print job by utilizing the rasterized data segments stored at the first memory and the second memory.

7. The printing system of claim 5, wherein:
the control unit is further operable to initiate processing of an additional copy of the print job, to identify the data segment during processing of the additional copy, to determine whether the rasterized data segment resides at the first memory or the second memory, to provide the rasterized data segment to the marking engine from the first memory, responsive to determining that the rasterized data segment resides at the first memory, and to provide the rasterized data segment from the second memory to the marking engine, responsive to determining that the rasterized data segment resides at the second memory.

8. The printing system of claim 1, wherein:
the first memory comprises a hard disk; and
the second memory comprises a Random Access Memory.

9. A method for utilizing a printing system, comprising:
acquiring a print job and instructions for printing multiple copies of the print job;
initiating processing of a first copy of the print job;
instructing the RIP to rasterize a data segment of the print job;
determining a transfer time to transfer the rasterized data segment to a marking engine if it were stored at the first memory;
determining a threshold value; and
facilitating storage of the rasterized data segment at the second memory if the transfer time is greater than the threshold value.

10. The method of claim 9, further comprising:
determining the threshold value as based on a speed of the marking engine and a threshold value for a data segment that has been previously rasterized.

11. The method of claim 10, further comprising:
determining the threshold value based on an amount of free space at the second memory.

12. The method of claim 9, further comprising:
performing the steps of instructing the RIP to rasterize, determining the transfer time, to determining the threshold value, and facilitating storage of the rasterized data segment for each data segment of the print job.

13. The method of claim 9, further comprising:
facilitating storage of the rasterized data segment at the first memory if the transfer time is smaller than the threshold value.

14. The method of claim 9, further comprising:
initiating processing of an additional copy of the print job; and bypassing rasterization for the additional copy of the print job by utilizing the rasterized data segments stored at the first memory and the second memory.

15. The method of claim 9, further comprising:
initiating processing of an additional copy of the print job;
identifying the data segment during processing of the additional copy;
determining whether the rasterized data segment resides at the first memory or the second memory;
providing the rasterized data segment to the marking engine from the first memory, responsive to determining that the rasterized data segment resides at the first memory; and
providing the rasterized data segment from the second memory to the marking engine, responsive to determining that the rasterized data segment resides at the second memory.

16. The method of claim 9, wherein:
the first memory comprises a hard disk; and
the second memory comprises a Random Access Memory.

17. A non-transitory computer readable medium embodying programmed instructions which, when executed by a processor, are operable for performing a method comprising:
acquiring a print job and instructions for printing multiple copies of the print job;
initiating processing of a first copy of the print job;
instructing the RIP to rasterize a data segment of the print job;
determining a transfer time to transfer the rasterized data segment to a marking engine if it were stored at the first memory;
determining a threshold value; and
facilitating storage of the rasterized data segment at the second memory if the transfer time is greater than the threshold value.

18. The medium of claim 17, the method further comprising:
determining the threshold value as based on a speed of the marking engine and a threshold value for a data segment that has been previously rasterized.

19. The medium of claim 17, the method further comprising:
determining the threshold value based on an amount of free space at the second memory.

20. The medium of claim 17, the method further comprising:
performing the steps of instructing the RIP to rasterize, determining the transfer time, to determining the threshold value, and facilitating storage of the rasterized data segment for each data segment of the print job.

* * * * *